UNITED STATES PATENT OFFICE.

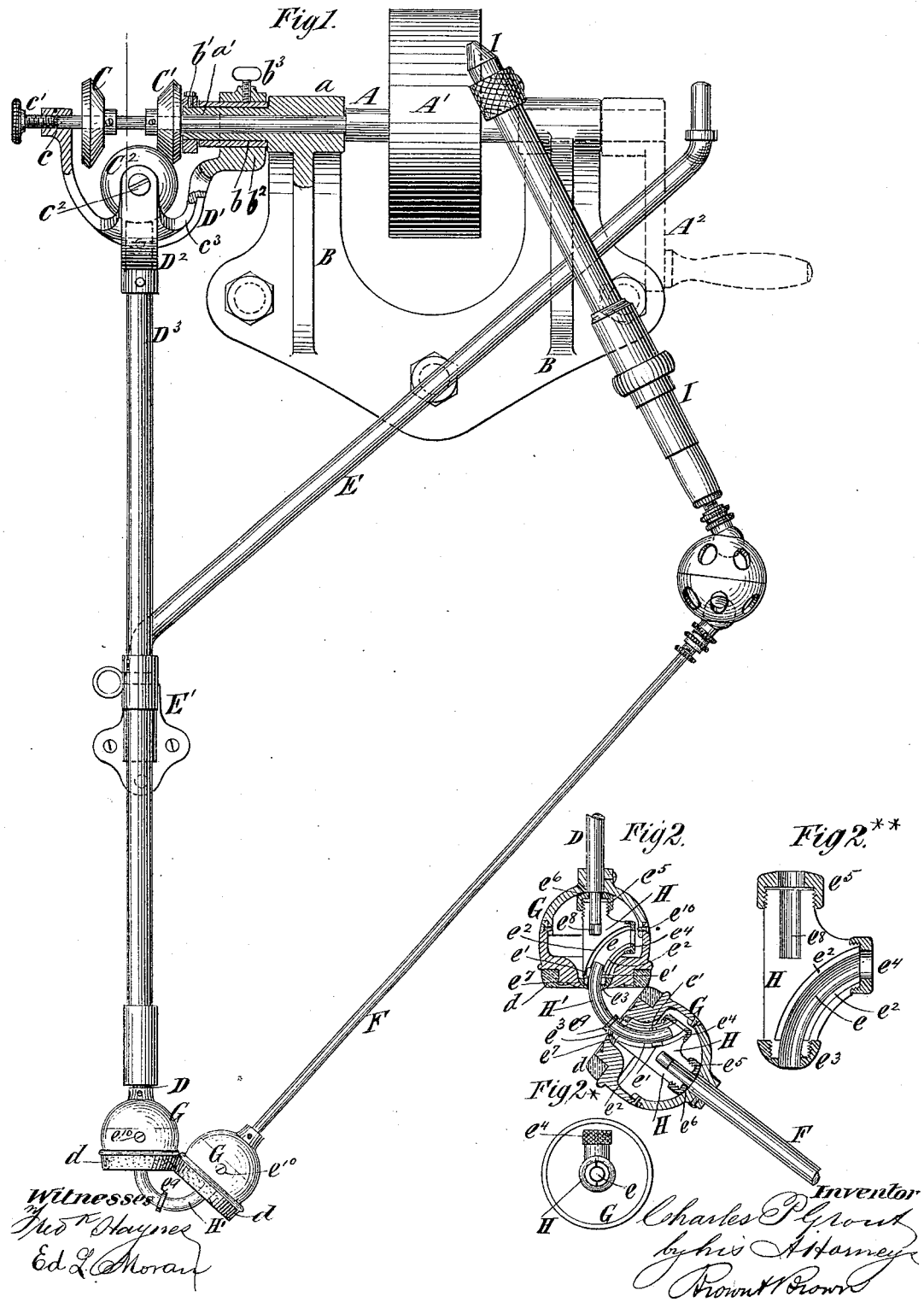

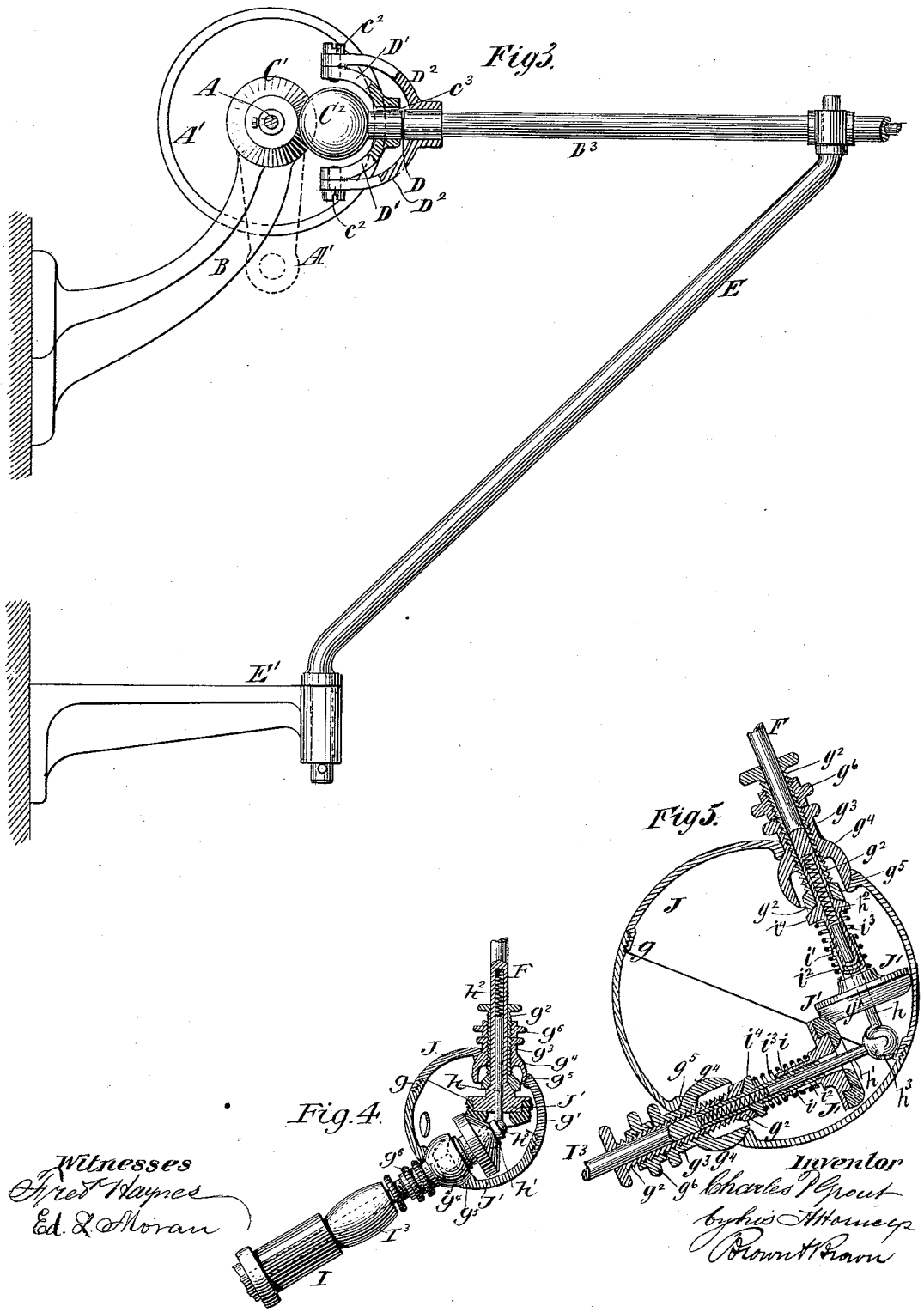

CHARLES P. GROUT, OF NEW YORK, N. Y.

DENTAL ENGINE.

SPECIFICATION forming part of Letters Patent No. 336,229, dated February 16, 1886.

Application filed June 23, 1883. Serial No. 98,997. (No model.)

*To all whom it may concern:*

Be it known that I, CHARLES P. GROUT, of the city of New York, in the county and State of New York, have invented a new and useful Improvement in Dental Engines, of which the following is a specification.

My invention consists in the combination, with a driving-shaft and reversely-set wheels thereon, of a second shaft carrying a wheel or sphere, whereby it derives motion from one or the other of the wheels on the driving-shaft, and a novel construction of yoke or yokes connecting the bearings of said second shaft with those of the driving-shaft, as hereinafter particularly described, and set forth in the claims.

The invention also consists in a coupling and driving or frictional driving shells of novel construction, whereby I connect two shafts of a dental engine flexibly together, and in a novel construction of a coupling and gearing, whereby the hand-piece of a dental engine may be connected with its operating-shaft.

In the accompanying drawings, Figure 1 is a partly sectional view of an engine embodying my invention, and adapted to be secured to a wall or other support. Fig. 2 is a sectional view of the coupling which I employ to flexibly connect two shafts of the engine, upon a larger scale than Fig. 1. Fig. 2* is a transverse section of one of the frictional driving-shells and a part of the couplings shown in Fig. 2, and Fig. 2** is a sectional view upon a larger scale of one part of the coupling. Fig. 3 is a partly sectional view showing the driving-shaft and second shaft with their yoke-connection. Fig. 4 is a sectional view of the coupling between the hand-piece and its operating-shaft; and Fig. 5 is a sectional view of the coupling shown in Fig. 4 upon a larger scale, and embodying a slight modification of my invention.

Similar letters of reference designate corresponding parts in all the figures.

Although I have here shown an engine having its driving-shaft supported in brackets which are adapted to be secured to a wall or other upright support, I would say that the invention is equally applicable to a pedestal portable engine to be operated by foot-power, the driving-shaft being represented by the vertical or other transmitting shaft of the engine.

A designates a driving-shaft, which is supported in bearings in a bracket, B, which may be secured to a wall or other suitable support. The shaft A may be rotated either by means of a belt over a pulley, A', or by means of a hand-crank, A², applied to the shaft, as shown by dotted lines in Fig. 1, or in any other suitable way.

Upon the shaft A are secured two oppositely-arranged frictional bevel-wheels, C C', of which one or the other engages with a spherical frictional device, C², secured to a second shaft, D, through which motion is transmitted from the driving-shaft A. The device C² need not be a perfect sphere; but its gearing surfaces are of spherical contour.

Formed upon or attached to one of the bearings $a$ of the bracket B is a fixed tube or hub, $a'$, and upon the latter is fitted a sleeve, $b$, which is free to turn thereon, but is confined lengthwise by a collar, $b'$, which may be secured in place on the fixed tube or hub $a'$ by means of a set-screw.

D' designates a yoke comprising an eye, $b^2$, which fits the sleeve $b$, and is adapted to be slid along the same and secured thereto by a set-screw, $b^3$, and an outer eye or bearing, $c$, which receives the outer end of the driving-shaft A, and a set-screw, $c'$, which forms a pivot, to center the yoke on the said end of the shaft. By shifting the yoke D' on the sleeve $b$ and securing it in position the sphere C² can be brought against and held in frictional engagement with either wheel C or C' and the shaft D rotated in whichever direction desired. When the yoke D' is shifted outward, its set-screw $c'$ is set up against the end of the driving-shaft, so as to steady the yoke D', and in whatever position the yoke is, it and the sleeve $b$, to which it is fast, can be swung upon the fixed tube $a'$, so as to adjust the shaft D in a plane transverse to the length of the driving-shaft A. If adjustment in this one plane only be sufficient, I may form the bearing for the shaft D in the yoke D'; but in order that the said shaft may be also swung in a plane parallel with the driving-shaft I form its bearing in a second yoke, D², which embraces the yoke D', as shown in Fig. 3, and can swing on pivots or trunnions c².

As here represented, the shaft D is surrounded by a guide-tube or fixed sleeve, D³, and in order to support this tube and its contained shaft in any position desired I may employ a prop or brace, E, pivoted in a bracket or foot-piece, E', on the wall, so that it may be swung out and made to support the tube, as shown in Fig. 3. In the yoke D' there is an arc-shaped slot or opening, c³, through which the shaft D and its tube D³ play when the shaft is swung in a plane parallel with the driving-shaft A.

F designates a shaft, which is connected with the shaft D by a coupling which I will now describe. Upon the adjacent ends of the shafts D and F are secured shells G G, which are rabbeted at their ends so as to receive rings d, of india-rubber or other suitable material, which have a frictional engagement with each other, as best shown in Fig. 2. Within the shells G are contained the essential parts of the coupling, which I term "body-pieces" H. They do not turn with the shells, but remain stationary or non-rotary, and are provided with curved bores or sockets e, which receive a correspondingly curved or arc-shaped bar or stem, H', which forms a connection between the two body-pieces. Projecting from the sides of the bar, rod, or stem H', within the bore or socket e in each body-piece H, are lugs or ears e', which fit into or engage with grooves $e^2$ in opposite sides of the bore or socket e, as shown in Fig. 2.

In order to conveniently form the bore and grooves $e$ $e^2$ in the body-piece H, they are made in halves or sections, or are divided longitudinally, one of said halves or sections being shown on a larger scale in Fig. 2**.

In order to hold the two sections of the body-piece H together I apply at the outer end of the bore e a cap-piece, $e^3$, which may be soldered on, and at the other end of the bore e a cap, $e^4$, which may be either screwed or soldered on the sections of the body-piece; and at the end of the body-piece adjacent to the shafts D and F, I apply a nut, $e^5$, screwed onto the sections of the body-piece and bearing on a seat, $e^6$, in the end of the shell G. The cap or head $e^3$ bears in a rounded seat, $e^7$, formed in the outer end of the shell G.

In the inner end of the body-piece H is a hole or socket, $e^8$, into which the end of the shaft D or F enters, and wherein the shaft may turn freely. It will be observed that the lugs or ears $e'$ on the curved bar or stem H' will strike against the cap or head $e^3$ and prevent the bar or stem from being entirely withdrawn from the bore or socket e, while the cap $e^4$ will prevent too great movement of the bar or stem in the other direction; but a small collar, $e^9$, on the middle of the bar or stem H' would answer the same purpose as the cap $e^4$.

As before stated, the cap or head $e^3$ has a seat, $e^7$, in the outer end of the shell G, while the nut $e^5$ has a corresponding seat, $e^6$, in the inner end of the shell. These seats form bearings for the shell on the body-piece H, and, in conjunction with the end of the shaft D or F, entering the end of the body-piece, said bearings preserve the shell and body-piece in proper relation to each other. The curved bar or stem H' provides for the adjustment of the shafts D F and the body-pieces and shells H G at almost any angle relatively to each other, and also holds the frictional surfaces of the shells always in driving-contact. The shafts D F may be brought almost into line with each other, or they may be adjusted so as to form an acute angle with each other, as shown in Fig. 1, or an obtuse angle with each other, as shown in Fig. 2.

In order to introduce the body-piece H into the shell G, the latter must be made in two parts, as shown best in Fig. 2, forming a joint which is made by screws $e^{10}$ or otherwise. The seats $e^6$ $e^7$ rotating on the cap $e^3$ and nut $e^5$ of the body-piece H will produce wear, and I provide for taking up the wear by turning the nut $e^5$ so as to hold it and the cap $e^3$ against their seats $e^6$ $e^7$ with sufficient pressure.

I will now describe the construction of the coupling which connects the hand-piece I with the end of the shaft F, and which is shown in Figs. 4 and 5. The hand-piece I may be of any suitable character.

The shank $I^3$ of the hand-piece may be considered as a shaft, so far as the coupling is concerned, which connects it with the shaft F.

Referring first to Fig. 4, J designates the shell into which the shafts $I^3$ F project, and which is shown as composed of two hemispherical sections united by a screw-joint, $g$. Upon the ends of the shafts $I^3$ and F are wheels J', one or both of which may be provided with rubber friction-surfaces, like the ring $g'$ shown in Fig. 4. As here shown, a sleeve, $g^2$, which is externally screw-threaded, fits upon each shaft F $I^3$, and the end of which bears against the hub of the wheel J', the wheel-hub having a conical or taper face and the end of the sleeve $g^2$ having a head correspondingly shaped. Upon the outer end of the sleeve $g^2$ is a flange or head, whereby it may be turned. Upon the sleeve $g^2$ is screwed an outer sleeve, $g^3$, the inner end, $g^4$, of which is enlarged so as to fit a seat, $g^5$, of corresponding shape in the shell J, and upon the sleeve $g^2$ is also fitted a jam-nut, $g^6$. By turning the outer sleeve, $g^3$, the inner sleeve is advanced so that its inner end is caused to press against the hub of the wheel J', while the enlarged head or end $g^4$ is pressed more tightly into its seat $g^5$. By this means wear may be compensated for, and the wheels $g'$ may be held in proper frictional engagement with each other. The outer sleeve, $g^3$, may then be securely fixed on the sleeve $g^2$ by means of the jam-nut $g^6$. The enlarged heads or ends $g^4$ of the sleeves $g^3$ fit in the seats $g^5$ in the shell J, so that they form swivel-connections between the shafts and the shell and permit of the shafts being adjusted at various angles with each other.

In order to have the wheels J' engage properly it is necessary to connect the ends of the shafts I³ F together, and this I may do by means of rods h h', inserted in the ends of the shafts and adapted to slide in and out therein. These rods are seated on springs h², which are inserted in the ends of the shafts, and consequently are impelled outward and against each other. They are connected by a ball-and-socket joint, h³, and hold the wheels J' in tight driving-contact, while they permit the adjustment of the shaft I³ and the handpiece I at different angles to the shaft F.

The construction shown in Fig. 5 is substantially the same as that above described with reference to Fig. 4, save that the wheels J', instead of being fast on the shafts I³ F, are capable of sliding thereon. Each wheel is formed with a sleeve, i, which is locked to the shaft by a pin, i', on the shaft entering a slot, i², in the sleeve, and the wheel is impelled outward by a spring, i³, acting between the end of the sleeve and a collar, i⁴, on the shaft, and against the opposite side of this collar bears the inner end of the sleeve g². As the shafts I³ F are brought more nearly into line, the wheels J' must slide inward on their shafts, while the adjustment of the shafts at greater angles to each other allows the wheels to slide outward. By means of the springs i³ the wheels are held in sufficiently close contact to transmit motion.

As shown in Fig. 5, the two shafts I³ F are adjusted at right angles to each other, and by making the shell J egg-shaped or oblong the shafts may be set at more acute angles.

In lieu of employing a spherical shell, J, of the form shown, I may employ a shell or yoke of any suitable form.

Although I have only shown and described my invention as embodied in a dental engine, it is evident that the invention might be embodied in machinery for other purposes.

What I claim as my invention, and desire to secure by Letters Patent, is—

1. The combination, with a driving-shaft and reversely-set wheels secured thereon, of a second shaft provided with a wheel or sphere and a yoke supporting said second shaft, and adapted to turn about the driving-shaft and to slide lengthwise thereof, so as to bring the wheel or sphere on the second shaft in engagement with either of the wheels on said driving-shaft, substantially as and for the purpose described.

2. The combination, with the driving-shaft and reversely-set wheels thereon, of a second shaft provided with a wheel or sphere, a yoke adapted to turn about the driving-shaft and to slide lengthwise thereof, and a second yoke having a bearing for said second shaft and pivoted or fulcrumed to the first-mentioned yoke, so as to provide for swinging the second shaft in a plane parallel with said driving-shaft, substantially as and for the purpose described.

3. The combination, with the driving-shaft A and reversely-set wheels C C', of the fixed tube a', surrounding said shaft, the rotary sleeve b, the yoke D', adapted to be secured to and to be adjusted lengthwise of said sleeve, and the shaft D and sphere or wheel C², substantially as described.

4. The combination, with the driving-shaft A and reversely-set wheels C C', and the fixed tube a', surrounding said shaft, of the yoke D', comprising the eye b², fitting said sleeve and adapted to be adjusted lengthwise thereof, and the eye c, fitting the outer end of the shaft A, the pivot-screw c', and the shaft D and wheel or sphere C², substantially as described.

5. The combination, with the driving-shaft A and reversely-set wheels C C', of the fixed tube a', the sleeve b, the yoke D', adapted to be adjusted on said sleeve lengthwise thereof, the shaft D and its wheel or sphere C², and the second yoke, D², fulcrumed by pivots or trunnions c² to the yoke D', and containing a bearing for the shaft D, substantially as described.

6. The combination, with two shafts and shells fixed to the adjacent ends thereof and geared together, of non-rotary body-pieces contained within said shells, and a curved or arc-shaped bar or rod adapted to slide in corresponding bores or sockets in said body-pieces and holding the said shells in contact, substantially as and for the purpose described.

7. The combination, with two shafts and shells fixed to their adjacent ends and geared together, of non-rotary body-pieces within the shells, the opposite ends of which bear against seats in the shells, and which are provided with means for taking up wear between them and the shells, and a curved or arc-shaped rod or bar adapted to slide in corresponding bores or sockets in said body-pieces and holding said shells in contact, substantially as and for the purpose described.

8. The combination of the shafts D F, the shells G G, each composed of separate sections and geared together, and the body-pieces H, and curved or arc-shaped rod or stem H', connecting and sliding in said body-pieces, substantially as described.

9. The combination of the shafts D F, the shells G, geared together, the body-pieces H, bearing against seats e⁶ e⁷ in said shells, and provided with nuts e⁵ for taking up wear, and the curved or arc-shaped rod or stem H', substantially as described.

10. The combination of the shafts D F, the shells G, geared together, the divided body-pieces H, each composed of two sections held together by caps e³ e⁴, and a nut, e⁵, and constructed with grooved bores or sockets e, and the curved or arc-shaped rod or stem H', provided with lugs or ears e', fitting the grooves in said bores or sockets e, substantially as described.

11. The combination, with two shafts provided with driving-wheels at their adjacent ends, of a shell or yoke containing said wheels and into which said shafts project, swivel-connections between said shafts and the shell or yoke, and devices connecting the ends of said shafts to hold the wheels in engagement, substantially as described.

12. The combination, with two shafts provided with driving-wheels at their adjacent ends, of a shell or yoke into which said shafts project and which contains said wheels, swivel-connections between said shafts and the shell or yoke, and a ball and-socket connection between the ends of said shafts, substantially as described.

13. The combination, with two shafts provided with driving-wheels at their adjacent ends, of a shell or yoke into which said shafts project and which contains said wheels, swivel-connections between said shafts and the shell or yoke, and rods seated on springs in the ends of said shafts so that they may slide in said shafts and connected by a ball-and-socket joint, substantially as described.

14. The combination, with two shafts and wheels sliding upon but adapted to turn with their adjacent ends, of a shell or yoke into which said shafts project and which contain the wheels, swivel-connections between said shafts and shell or yoke, and a connection between the ends of said shafts for holding said wheels in contact, substantially as described.

CHAS. P. GROUT.

Witnesses:
FREDK. HAYNES,
ED. L. MORAN.